United States Patent
Sevenhuijsen et al.

(10) Patent No.: US 7,523,923 B2
(45) Date of Patent: Apr. 28, 2009

(54) FLUID DISTRIBUTION TRAY AND METHOD FOR THE DISTRIBUTION OF A HIGHLY DISPERSED FLUID ACROSS A BED OF CONTACT MATERIAL

(75) Inventors: Eric Sevenhuijsen, Houston, TX (US); Marjanne Clara Zonnevylle, Houston, TX (US)

(73) Assignee: Shell Oil Company, Houston, TX (US)

( * ) Notice: Subject to any disclaimer, the term of this patent is extended or adjusted under 35 U.S.C. 154(b) by 539 days.

(21) Appl. No.: 11/406,419

(22) Filed: Apr. 18, 2006

(65) Prior Publication Data
US 2007/0241467 A1 Oct. 18, 2007

(51) Int. Cl.
*B01F 3/04* (2006.01)
(52) U.S. Cl. .......................................... 261/97; 261/110
(58) Field of Classification Search .................... 261/74, 261/97, 98, 110, 113
See application file for complete search history.

(56) References Cited

U.S. PATENT DOCUMENTS

| | | | | |
|---|---|---|---|---|
| 4,808,350 A | * | 2/1989 | Robbins et al. | 261/96 |
| 4,836,989 A | * | 6/1989 | Aly et al. | 422/195 |
| 5,403,561 A | | 4/1995 | Koros et al. | 422/195 |
| 5,484,578 A | | 1/1996 | Muldowney et al. | 422/220 |
| 5,882,610 A | | 3/1999 | Darmancier et al. | 422/220 |
| 5,935,389 A | * | 8/1999 | Hine et al. | 202/158 |
| 6,093,373 A | | 7/2000 | Darmancier et al. | 422/220 |
| 6,338,828 B1 | | 1/2002 | Stupin et al. | 422/224 |
| 7,445,198 B2 | * | 11/2008 | Monkelbaan | 261/97 |
| 2004/0028579 A1 | | 2/2004 | Van Der Meer et al. | 422/194 |

* cited by examiner

*Primary Examiner*—Scott Bushey
(74) *Attorney, Agent, or Firm*—Charles W. Stewart

(57) ABSTRACT

A fluid distribution tray that is capable of providing for the distribution of a fluid across a surface area of a bed of contact material contained within a vessel, wherein the fluid distribution tray includes lost area due to a support element upon which the fluid distribution tray is supported within the vessel, wherein the fluid distribution tray includes a plurality of fluid flow means distributed across the fluid distribution tray in a distribution pattern providing for a high density distribution of fluid flow means within a compensation area that is adjacent and near to the lost area and a low density distribution of fluid flow means within the remaining useable area of the fluid distribution tray. Also included is a method providing for a uniform fluid distribution within a vessel.

21 Claims, 2 Drawing Sheets

FLUID DISTRIBUTION TRAY AND METHOD FOR THE DISTRIBUTION OF A HIGHLY DISPERSED FLUID ACROSS A BED OF CONTACT MATERIAL

This invention relates to a high dispersion fluid distribution tray. Another aspect of the invention relates to a method of dispersing a fluid across a bed of contact material contained within a vessel.

BACKGROUND

In many downflow type reactors that include a catalyst bed it is beneficial for the fluid feed to the reactor to be uniformly distributed across and through the catalyst bed. Often, to improve the fluid feed distribution across the catalyst bed, the reactor will be equipped with fluid distribution trays that provide for an improved dispersion of the fluid feed.

One example of a device providing for a uniform distribution of a fluid feed stream across a catalyst bed of a reactor is that which is disclosed in U.S. Pat. No. 5,403,561. This patent discloses the use within a reactor vessel of a flow distributor apparatus for uniformly distributing a mixed phase fluid stream across the top of a catalyst bed. The flow distribution apparatus includes a horizontal tray with a plurality of spaced apart chimneys extending through the horizontal trays. The lower end of each chimney has a spray means for producing a conical spray. The chimneys and spray means are positioned so that the spray patterns overlap and that none of the spray produced impinges on beams and other structural reactor internals located below the horizontal tray and above the catalyst bed. There is no other explicit disclosure of the use of support beams and other structure for supporting the horizontal tray nor is there a recognition of the problems associated with the inability to provide for fluid conduits for passing fluid from above the horizontal tray onto the catalyst bed at locations at which the horizontal trays are supported.

Another type of fluid distribution device is disclosed in U.S. Pat. No. 5,882,610 which is placed over a catalyst bed within a reactor and which provides for distribution of a gas-liquid mixture through a catalyst bed of the reactor. The distribution device includes a distributor plate having conduits such as orifices or mixing channels for passing fluid to the catalyst bed. This patent further teaches the support of the distributor plate by the use of stiffeners disposed upon the upper face of the distributor plate or by the use of support beams placed below the bottom of the distributor plate, or by both methods. The patent, however, fails to address or even recognize the problems caused by the placement of support beams below the surface of the distributor plate. Such problems occur when a distributor plate area is obstructed by support beams thereby rendering it not useable for the placement of fluid conduits or downcomers for passing fluid to the catalyst bed. This creates a void area over which no fluid is distributed resulting in a reduced uniformity in the fluid distribution across the catalyst bed.

SUMMARY

It is one object of the invention to provide a fluid distribution tray within a reactor vessel that may be supported by support beams and which provides for a highly uniform distribution of fluid across the catalyst bed within the reactor vessel.

Accordingly, provided is a fluid distribution tray for distributing a fluid across a top surface area of a bed of contact material contained within a vessel, wherein said fluid distribution tray comprises: a panel tray having a lost area due to a support element upon which said panel tray is supported within said vessel and a remaining useable area of said panel tray; and a plurality of fluid flow means distributed across said panel tray in a distribution pattern providing for a high-density distribution of said fluid flow means within a compensation area within said remaining useable area that is adjacent and near to said lost area and providing for a low-density distribution of said fluid flow means within said remaining useable area other than said compensation area.

Also provided is a reactor system, comprising: a vessel, having inlet means for receiving a two-phase mixture within said vessel and outlet means for withdrawing a product stream from said vessel, wherein within said vessel is contained a catalyst bed having an upper surface area; a fluid distribution tray system for providing for the distribution of a fluid across said upper surface area, wherein said fluid distribution tray system comprises: a panel tray, having a panel tray area, wherein at least a portion of said panel tray area bears upon a support element surface of a support element to thereby provide a lost area of said panel tray area, which is said at least a portion of said panel tray area bearing upon said support element surface, and a remaining useable area of said panel tray area, which is the difference between said panel tray area and said lost area; and a plurality of fluid flow means distributed across said remaining useable area of said panel tray area in a distribution pattern providing for a high density distribution of fluid flow means within a compensation area defined by said remaining useable area that is adjacent and near to said lost area and providing for a low density distribution of fluid flow means within said remaining useable area other than said compensation area.

Further provided is a method for distributing a highly dispersed fluid across a bed of contact material contained within a vessel, wherein said method comprises: flowing a fluid over a panel tray, having a panel tray area, wherein at least a portion of said panel tray area bears upon a support element surface of a support element to thereby provide a lost area of said panel tray area, which is said at least a portion of said panel tray area bearing upon said support element surface, and a remaining useable area of said panel tray area, which is the difference between said panel tray area and said lost area; passing said fluid through a plurality of fluid flow means distributed across said remaining useable area of said panel tray area in a distribution pattern providing for a high density distribution of fluid flow means within a compensation area defined by said remaining useable area that is adjacent and near to said lost area and providing for a low density distribution of fluid flow means within said remaining useable area other than said compensation area; and yielding from said plurality of fluid flow means said highly dispersed fluid.

DETAILED DESCRIPTION OF THE INVENTION

Figure 1:
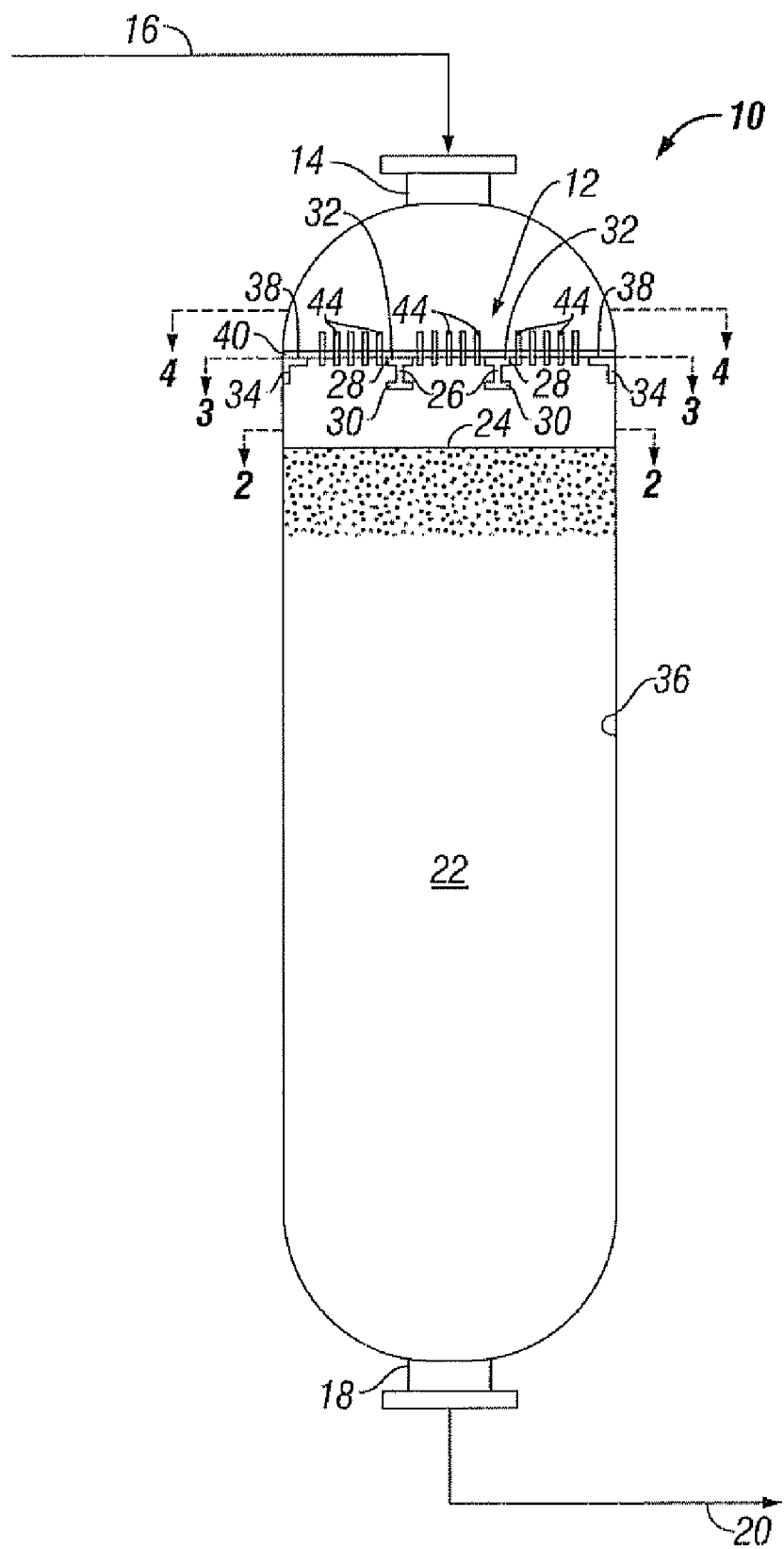
FIG. 1 schematically depicts a vertical cross sectional view of a reactor vessel equipped with one embodiment of the inventive high dispersion fluid distribution tray.

Downflow type reactor systems that include a vessel containing a bed of contact material, such as a catalyst, over and through which a feedstock is passed are used in many petroleum and chemical processes. These reactor systems are used in all kinds and types of processes including those that require the contacting of the feedstock with a catalyst for catalyzing reactions such as any of the hydroprocessing reactions known to those skilled in the art of chemical processing including hydrodesulfurization, hydrodenitrogenation, hydrodemetallization, hydrocracking, and dehydrogenation. Some of the processes that include the use of downflow type reactor systems further may include liquid downflow reactor systems, gaseous downflow reactor systems and two-phase downflow reactor systems. These systems can include the so-called trickle flow reactor system in which a liquid is placed over a catalyst bed and allowed to pass through the catalyst bed by gravity flow.

In many of the aforementioned applications it can be important for the feedstock to a downflow reactor system to be uniformly distributed across the bed of contact material so as to provide for a flow of the feedstock through the bed that approaches plug flow. One aspect of the invention is that it provides for an improved distribution of fluid flow across the bed of a contact material, which can include catalysts, sorbents, packing material, molecular sieves or any other similar type of material that may be contacted with a feedstock to effect a chemical result, that is contained in a reactor vessel.

A particularly advantageous feature of certain embodiments of the invention is that it provides for a highly dispersed flow of a two-phase fluid (e.g. gas and liquid) across the surface and through a bed of contact material contained within a vessel, e.g. a reactor vessel. This highly dispersed flow provides for a highly uniform distribution of fluid across the surface of the bed of contact material resulting in a flow of the fluid through the bed that approaches plug flow.

One embodiment of the invention includes a fluid distribution tray that may be placed in a vessel at a location above the top surface area of a bed of contact material contained within the vessel. The fluid distribution tray provides for the distribution and dispersion of the fluid across the cross sectional area of the vessel and for flow of fluid upon the top surface area of the bed of contact material, and, further providing for a placement of the fluid across the top surface of the bed of contact material in a pattern that preferably approaches uniformity so as to provide fluid flow through the bed that may approach plug flow.

The fluid distribution tray comprises a panel tray which further can include one or more or even a plurality of fluid flow means for passing or for conveying fluid from above the fluid distribution tray to below the fluid distribution tray and onto the top surface area of the bed of contact material. The fluid flow means can be any suitable means that allows for the passage of fluid from one point to a destination point, for example, any type of conduit including nozzles, tubular conduits, orifices, apertures or any other type of opening that is capable of conducting a fluid therethrough. Among the various suitable types of fluid flow means, one preferred fluid flow means includes a downcomer nozzle as is more fully described elsewhere herein.

In one typical use of the inventive fluid distribution tray, it is supported within a reactor vessel by support means for supporting the fluid distribution tray at a location and placement below the reactor feed inlet and above the top surface of the catalyst bed. The support means can include any suitable structural element or elements upon which the panel tray or trays of the fluid distribution tray may rest.

One example of a support means includes at least one support beam that may span the cross section of the reactor vessel. While the support beam may be any type of structural shape that is capable of providing for the support of the panel tray, it is contemplated that a preferred support beam is of the type that includes a flange that provides a support surface upon which the panel tray may rest and be supported. Also, the panel tray may further be supported at or near to the inside wall of the reactor vessel by a support element or means. This support element can include a support rim that is affixed to the inside wall of the reactor vessel and which provides a surface upon which the panel tray may rest and be supported.

One problem caused by the use of the aforementioned support means or elements occurs when it is desirable for the fluid distribution tray to provide for a distribution of fluid within the reactor vessel that approaches uniformity; since, due to the obstructions posed by the support elements below the panel tray, the fluid flow means may not be placed, or they are otherwise non-functional when placed, at locations upon the panel tray that rests upon the surfaces of the support means. This has the effect of causing a lost area of use on the panel tray at the locations where it will bear upon the surface of a support element and thereby result in non-uniform placement of the fluid flow means causing, when in use, maldistribution of fluid flow across the top surface of the catalyst bed, and, in particular, fluid flow deficits at the locations directly below the fluid distribution tray support elements.

The portion of the panel tray that is not lost area, as described above, is referred to herein as a remaining useable area; since, the remaining useable area is that area of the panel tray whereupon fluid flow means may effectively be utilized. The fluid flow means are distributed across the remaining useable area of the panel tray area in any number of distribution patterns and densities. The fluid flow means, for example, apertures, orifices, and nozzles, are generally placed in a spaced apart orientation in either a triangular pitch or a square pitch orientation.

Various embodiments of the invention provide for a resolution of the problems resulting from the lost areas of use on the panel tray of the fluid distribution tray caused by the use of support means for supporting the panel tray within the reactor vessel. One such feature of the inventive fluid distribution tray is in the novel distribution pattern of the placement of the fluid flow means upon the remaining useable area of the panel tray. In this distribution pattern, there is a high-density distribution and a low-density distribution of the fluid flow means across the remaining useable area of the panel tray. The high-density distribution of the fluid flow means is, generally, within a compensation area that is within the remaining useable area of the panel tray and at locations that are adjacent and near to the lost areas. The low-density distribution of the fluid flow means is, generally, within the remaining useable area of the panel tray outside of the compensation area.

A typical layout of the fluid flow means of a panel tray that is not supported from below its surface and having no obstructions to the placement of its fluid flow means is for them to be placed substantially uniformly across the panel tray in either a triangular pitch or a square pitch orientation. Thus, in such case, the density distribution of the fluid flow means across the panel tray is substantially uniform. What is meant herein when referring to the density distribution of the fluid flow means within a panel tray is the particular ratio of the number of fluid flow means that are placed within a unit area, for example, the number of fluid flow means per square meter of the panel tray area.

In determining the density distribution, each fluid flow means is represented by a single point located at its center or center of mass with the density distribution computed by determining the number of the single points per unit of area. A typical density distribution for a uniformly placed fluid flow means layout of commercially used equipment is in the range of from 20 to 120 fluid flow means per square meter.

In the inventive fluid distribution tray, to offset the loss in effective fluid distribution area due to the lost area of the panel tray, a high-density distribution compensation area is provided. One way of providing for the compensation area is to first determine the number of fluid flow means that would normally be placed in the lost area of a panel tray for a situation when the fluid flow means is uniformly distributed across the entire panel tray that will span the cross section of a vessel. This number of fluid flow means is determined by multiplying a desired fluid flow means density distribution by the lost area of the panel tray to give a number of fluid flow means that would normally be placed in the lost area if there were no structural obstructions due to the fluid distribution tray supports. The number of fluid flow means that would be placed in the lost area is instead placed in the compensation areas of the panel areas that are near to, and, preferably, contiguous and adjacent to, the lost areas of the panel tray in addition to the fluid flow means already placed in such compensation area to thereby provide for the high-density distribution of fluid flow means.

The compensation area in which there is a high-density distribution of fluid flow means may approximate the lost area, but it can otherwise amount to an area in the range of from about 0.25 to about 5 times the lost area, but, preferably, from 0.75 to 4 times the lost area, and, most preferably, from 1 to 3 times the lost area.

The remaining useable area other than the compensation area of the panel tray has included therein a low-density distribution of fluid flow means. What is meant by the reference to low-density distribution is that the density distribution of the fluid flow means in the remaining useable area other than the compensation area is smaller than the density distribution of the fluid flow means in the high-density distribution compensation area. In a commercial embodiment of the invention, the density distribution of fluid flow means in the low-density distribution area of the panel tray can be in the range of from 20 to 120 fluid flow means per square meter, and, preferably, in the range of from 30 to 100 fluid flow means per square meter, and, most preferably, from 40 to 90 fluid flow means per square meter.

As already noted, the density distribution of fluid flow means in the compensation area of the panel tray is greater than the density distribution in the low-density area of the panel tray, and it can be in the range exceeding 1.25 times the density distribution of fluid flow means in the low-density distribution area. It is more desirable, however, for the density distribution in the high-density compensation area to exceed 1.5 times the density distribution of the fluid flow means in the low-density distribution area. A preferred density distribution in the high-density compensation area exceeds 1.75 times the density distribution of the fluid flow means in the low-density distribution area, and, most preferred, it exceeds 2 times the density distribution of the fluid flow means in the low-density distribution area.

The fluid flow means of the panel trays of the inventive fluid distribution tray can be any suitable means known to those skilled in the art and those that are described herein. Additional examples of some of the suitable types of fluid flow means are those that are disclosed in U.S. Pat. No. 5,403,561; U.S. Pat. No. 5,882,610; U.S. Pat. No. 6,093,373; and U.S. Pub. No. 2004/0028579, each of which is incorporated herein by reference. One particularly suitable fluid flow means for use with the panel tray of the inventive fluid distribution tray, when it is used in the distribution of a two-phase (liquid and gas) fluid, is a downcomer nozzle that is tubular in shape and has a length.

It is also noted that the fluid flow conduit openings of the fluid flow means, whether they are circular holes, apertures of various shapes, orifices or tubular conduits of various shapes, including circular shapes, may have a wide range of cross sectional areas that permit the passage and flow of fluid. In the case of circular fluid flow conduit openings, their diameters may be in the range of from $\frac{1}{16}$ inch to 5 inches for typical commercial scale equipment. Thus, the cross sectional areas of the fluid flow conduit openings of the fluid flow means of the invention, when used in typical commercial scale applications, can be in the range of from 0.003 square inches to 30 square inches.

A preferred downcomer nozzle has a top end and a bottom end and, when it is operatively connected to the panel tray to provide for a conduit for fluid flow from above the panel tray to below the panel tray, the top end of the downcomer nozzle is placed at a location above the panel tray and the bottom end of the downcomer nozzle terminates at a location below the panel tray. The top end of the downcomer nozzle is preferably open so as to thereby allow for the passage of gas into the inside of the tube. Along the tube length are spaced apart apertures that provide conduits for liquid flow from outside the tube to the inside of the tube. The bottom end of the downcomer nozzle is open to allow for the passage of liquid and gas.

The inventive fluid distribution tray may be used to provide for a highly dispersed distribution of a fluid across a top surface of a bed of contact material contained within a vessel. The fluid to be dispersed may be any type of fluid that is required to be passed over a bed of contact material, such as a catalyst bed, for any variety of reasons including the chemical processing of the fluid. The fluid may be a liquid or a gas or a multi-phase fluid, such as a fluid containing both a gas and a liquid.

Certain embodiments of the inventive fluid distribution tray are particularly suitable for and are advantageously used in the dispersion of a gas-liquid fluid across the top surface of a bed of contact material so as to provide for the co-current trickle flow of the liquid and gas having a distribution across the top surface that approaches uniformity.

Numerous benefits may result from the uniform fluid distribution provided by the inventive fluid distribution tray. One such benefit, for example, is that the required amount of distributive packing that is often placed upon the top surface of a catalyst bed within a reactor vessel for the purpose of enhancing the uniformity of the distribution of fluid flow across the catalyst bed can be reduced. This reduction in the required amount of distributive packing that is used in the reactor vessel of a fixed volume allows for the replacement of the reduced amount of distributive packing with an amount of active catalyst or any other material that would be preferred over the use of the distributive packing.

Another potentially significant benefit resulting from the aforedescribed uniform fluid distribution is that it may provide for an improved temperature profile across the cross section and along the depth of a catalyst bed within the reactor vessel, particularly, in processes involving either exothermic or endothermic reactions.

Thus, in view of many of the aforementioned benefits, the invention further includes a method providing for the distribution of a highly dispersed fluid across a bed of contact material that is contained in a vessel. This method includes passing the fluid over the panel tray of the inventive fluid distribution tray. The fluid passes through the plurality of fluid flow means that are distributed across the remaining useable area of the panel tray and yielded from the plurality of fluid flow means is the highly dispersed fluid which flows upon the top surface and throughout the bed of contact material. When the fluid flow means of the plurality of fluid flow means includes a downcomer nozzle, a layer of liquid sits on top of the panel tray and, as the liquid level rises above the apertures of the downcomer nozzle, the liquid passes through the apertures into the inside of the tube and from the bottom end of the downcomer nozzle onto the top surface of the bed of contact material.

Now referring to FIG. 1, presented is a schematic representation of a vertical cross section of a reactor vessel 10 having incorporated therein a fluid distribution tray 12. Reactor vessel 10 is equipped with inlet means 14 that provides for receiving a fluid by way of conduit 16 and for the introduction of such fluid into reactor vessel 10. Reactor vessel 10 is also equipped with outlet means 18 that provides for the withdrawal of a product stream from the reactor vessel 10 and for its transfer therefrom by way of conduit 20.

Contained within reactor vessel 10 is a catalyst bed 22 that fills a major portion of the volume of reactor vessel 10. Catalyst bed 22 has a top or upper surface 24 spanning the cross section of the reactor vessel 10 thereby presenting a top or upper surface area 25.

Figure 2:
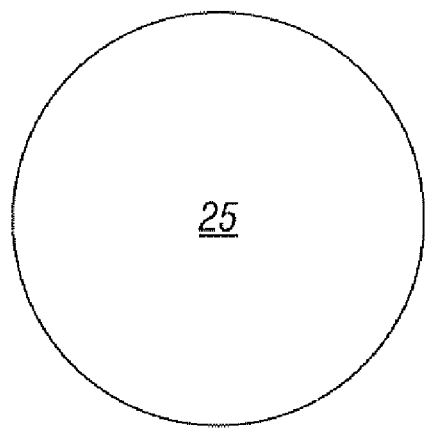
FIG. 2 is a plan view of the reactor vessel of FIG. 1 taken along section 2-2.

FIG. 2 is a plan view of the cross section of reactor vessel 10 taken along plane 2-2, which shows the cross sectional area of the top or upper surface 25 of catalyst bed 22.

Fluid distribution tray 12 is placed within rector vessel 10 at a position above the upper surface area 25 of catalyst bed 22 and below inlet means 14 so that when fluid feed is introduced into reactor vessel 10 it flows over fluid distribution tray 12, which provides for a highly dispersed flow of the fluid feed across the upper surface area 25 of catalyst bed 22.

The fluid distribution tray 12 is kept in position by support beams 26 that span the cross section of reactor vessel 10. While there are depicted two support beams 26, it is understood that there may be any suitable number of support beams 26 as is appropriate for the circumstances. Therefore, one or more, including more than two, support beams 26 may be utilized to support the fluid distribution tray 12 within the reactor vessel 10. Also, cross beams that are perpendicular or oblique to the support beams 26 may further be appropriate depending upon the specific design of the equipment. It is within the knowledge of those skilled in the art to determine the appropriate size, type, number and orientation of support members that would be required for a particular circumstance.

As is shown in FIG. 1, support beams 26 have two flanges including a top flange 28 and a bottom flange 30. The top flange 28 has a support surface 32.

Also providing support for fluid distribution tray 12 is support rim 34. The support rim 34 may be any suitable structural element by which the fluid distribution tray 12 may be supported in place. In one embodiment of the invention, the support rim 34 is affixed, such as by welding, to the inside wall 36 of the reactor vessel 10 and has a support surface 38 that extends away from the inside wall 36.

The fluid distribution tray 12 includes a panel tray 40 having therein a plurality of downcomer nozzles 44. As may be seen from FIG. 1, the downcomer nozzles 44 are only placed in areas within the panel tray 40 that are between the supporting surfaces 32 and 38 thereby creating void areas under which a reduced amount of fluid is distributed due to the lack of the presence of the downcomer nozzles 44. These void areas include those portions of the panel tray 40 that rest upon the support surfaces 32 and 38 and correspond to the lost areas 46 and 48 of the panel tray 40 over which there are no downcomer nozzles.

Figure 3:
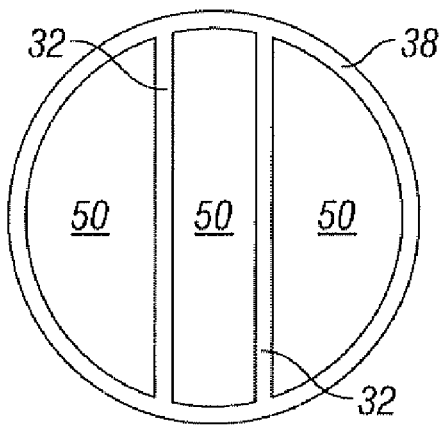
FIG. 3 is a plan view of the reactor vessel of FIG. 1 taken along section 3-3.

FIG. 3 presents a plan view of a cross section of the reactor vessel 10 taken along section 3-3, which is located along the bottom of the planar surface of panel tray 40. Shown in FIG. 3 are the support surfaces 32 corresponding to the top flanges 28 of the support beams 26. Also shown is the support surface 38 that corresponds to the surface of the support rim 34. The areas of the panel tray 40 that rest upon the support surfaces 32 and 38 is the area of the panel tray 40 that is lost from use due to an inability to place fluid flow means therein. The total area of the panel tray 40 that remains after the subtraction of the lost areas 46 and 48, which are those areas that match-up respectively with support surfaces 32 and 38, is the remaining useable area of the panel tray that corresponds to remaining area 50.

Figure 4:
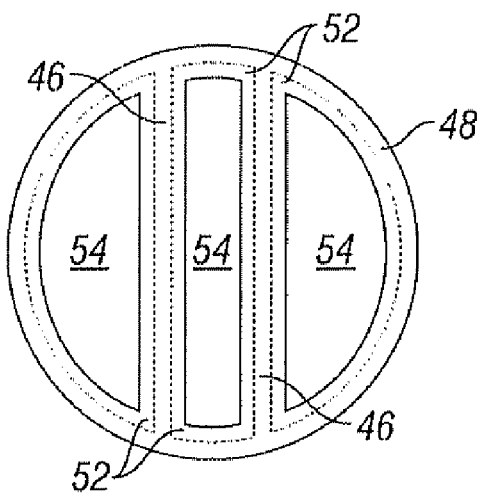
FIG. 4 is a plan view of the reactor vessel of FIG. 1 taken along section 4-4.

FIG. 4 presents a plan view of a cross section of the reactor vessel 10 taken along section 4-4, which is located immediately above the fluid distribution tray 12. For clarity purposes, the plan view of fluid distribution tray does not show the specific locations of the downcomer nozzles 44, but it does show by the use of broken lines the locations of the lost areas 46 and 48, and by the use of solid lines shown within the remaining area 50 is a compensation area 52 that is immediately adjacent and near to the lost areas 32 and 38. Within the compensation area 52, or alternatively referred to as a high-density distribution area, is a high-density distribution of the downcomer nozzles 44, and within the remaining useable area 50 that is outside the compensation area 52, referred as low-density distribution area 54, is a low density distribution of the downcomer nozzles 44. The references herein to density distribution of downcomer nozzles 44 are to the number of nozzles per area, such as, for example, nozzles per square meter. When referring to the high-density distribution of downcomer nozzles 44, in the broad sense, what is meant is that the nozzle density within the compensation area 52 is greater than the nozzle density within the low density distribution area 54 having a nozzle density that is less than that of the compensation area 52.

That which is claimed is:

1. A fluid distribution tray for distributing a fluid across a top surface area of a bed of contact material contained within a vessel, wherein said fluid distribution tray comprises:
    a panel tray having a lost area due to a support element upon which said panel tray is supported within said vessel and a remaining useable area of said panel tray; and
    a plurality of fluid flow means distributed across said panel tray in a distribution pattern providing for a high-density distribution of said fluid flow means within a compensation area within said remaining useable area that is adjacent and near to said lost area and providing for a low-density distribution of said fluid flow means within said remaining useable area other than said compensation area.

2. A fluid distribution tray as recited in claim 1, wherein said compensation area includes an area in the range of from 0.25 to 5 times said lost area.

3. A fluid distribution tray as recited in claim 2, wherein the density distribution of said high-density distribution area is greater than the density distribution of said low-density distribution area.

4. A fluid distribution tray as recited in claim 3, wherein said low-density distribution of said fluid flow means within said remaining useable area other than said compensation area is in the range of from 20 to 120 said fluid flow means per square meter of panel tray area.

5. A fluid distribution tray as recited in claim 4, wherein the density distribution of said high-density distribution exceeds 1.5 times the density distribution of said low-density distribution.

6. A fluid distribution tray as recited in claim 5, wherein said fluid flow means of said plurality of fluid flow means includes a downcomer nozzle comprising a tube defining an inside and having a length with a top end and a bottom end, wherein said downcomer nozzle is operatively connected to said panel tray so as to thereby provide for a conduit for fluid flow from above said panel tray to below said panel tray.

7. A fluid distribution tray as recited in claim 6, wherein said top end of said downcomer nozzle is located above said panel tray and is open so as to allow for the passage of gas into said inside of said tube, wherein along said length of said tube are spaced apart apertures providing conduits for liquid flow from the outside of said tube to said inside of said tube, and wherein said bottom end of said downcomer nozzle terminates below said panel tray and is open to allow for the passage of fluid therethrough.

8. A reactor system, comprising:
a vessel, having inlet means for receiving a two-phase mixture within said vessel and outlet means for withdrawing a product stream from said vessel, wherein within said vessel is contained a catalyst bed having an upper surface area;
a fluid distribution tray system for providing for the distribution of a fluid across said upper surface area, wherein said fluid distribution tray system comprises:
a panel tray, having a panel tray area, wherein at least a portion of said panel tray area bears upon a support element surface of a support element to thereby provide a lost area of said panel tray area, which is said at least a portion of said panel tray area bearing upon said support element surface, and a remaining useable area of said panel tray area, which is the difference between said panel tray area and said lost area; and
a plurality of fluid flow means distributed across said remaining useable area of said panel tray area in a distribution pattern providing for a high density distribution of fluid flow means within a compensation area defined by said remaining useable area that is adjacent and near to said lost area and providing for a low density distribution of fluid flow means within said remaining useable area other than said compensation area.

9. A reactor system as recited in claim 8, wherein said compensation area includes an area in the range of from 0.25 to 5 times said lost area.

10. A reactor system as recited in claim 9, wherein the density distribution of said high-density distribution area is greater than the density distribution of said low-density distribution area.

11. A reactor system as recited in claim 10, wherein said low-density distribution of said fluid flow means within said remaining useable area other than said compensation area is in the range of from 20 to 120 said fluid flow means per square meter of panel tray area.

12. A reactor system as recited in claim 11, wherein the density distribution of said high-density distribution exceeds 1.5 times the density distribution of said low-density distribution.

13. A reactor system as recited in claim 12, wherein said fluid flow means of said plurality of fluid flow means includes a downcomer nozzle comprising a tube defining an inside and having a length with a top end and a bottom end, wherein said downcomer nozzle is operatively connected to said panel tray so as to thereby provide for a conduit for fluid flow from above said panel tray to below said panel tray.

14. A reactor system as recited in claim 13, wherein said top end of said downcomer nozzle is located above said panel tray and is open so as to allow for the passage of gas into said inside of said tube, wherein along said length of said tube are spaced apart apertures providing conduits for liquid flow from the outside of said tube to said inside of said tube, and wherein said bottom end of said downcomer nozzle terminates below said panel tray and is open to allow for the passage of fluid therethrough.

15. A method that provides for the distribution of a highly dispersed fluid across a bed of contact material contained within a vessel, wherein said method comprises:
flowing a fluid over a panel tray, having a panel tray area, wherein at least a portion of said panel tray area bears upon a support element surface of a support element to thereby provide a lost area of said panel tray area, which is said at least a portion of said panel tray area bearing upon said support element surface, and a remaining useable area of said panel tray area, which is the difference between said panel tray area and said lost area;
passing said fluid through a plurality of fluid flow means distributed across said remaining useable area of said panel tray area in a distribution pattern providing for a high density distribution of fluid flow means within a compensation area defined by said remaining useable area that is adjacent and near to said lost area and providing for a low density distribution of fluid flow means within said remaining useable area other than said compensation area; and
yielding from said plurality of fluid flow means said highly dispersed fluid.

16. A method as recited in claim 15, wherein said compensation area includes an area in the range of from 0.25 to 5 times said lost area.

17. A method as recited in claim 16, wherein the density distribution of said high-density distribution area is greater than the density distribution of said low-density distribution area.

18. A method as recited in claim 17, wherein said low-density distribution of said fluid flow means within said remaining useable area other than said compensation area is in the range of from 20 to 120 said fluid flow means per square meter of panel tray area.

19. A method as recited in claim 18, wherein the density distribution of said high-density distribution exceeds 1.5 times the density distribution of said low-density distribution.

20. A method as recited in claim 19, wherein said fluid flow means of said plurality of fluid flow means includes a downcomer nozzle comprising a tube defining an inside and having a length with a top end and a bottom end, wherein said downcomer nozzle is operatively connected to said panel tray so as to thereby provide for a conduit for fluid flow from above said panel tray to below said panel tray.

21. A method as recited in claim 20, wherein said top end of said downcomer nozzle is located above said panel tray and is open so as to allow for the passage of gas into said inside of said tube, wherein along said length of said tube are spaced apart apertures providing conduits for liquid flow from the outside of said tube to said inside of said tube, and wherein said bottom end of said downcomer nozzle terminates below said panel tray and is open to allow for the passage of fluid therethrough.

* * * * *